(No Model.)
W. CURRY.
GLASS COVERED ELECTRIC WIRE.
No. 452,565. Patented May 19, 1891.
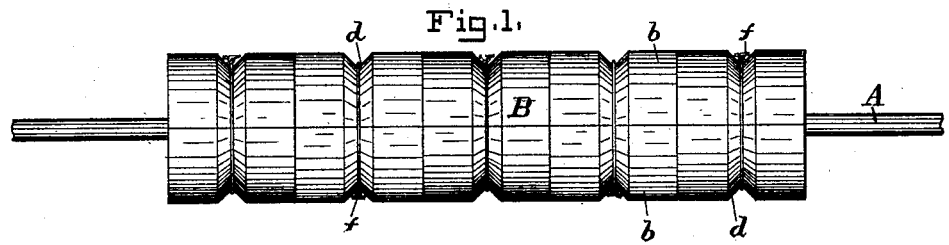
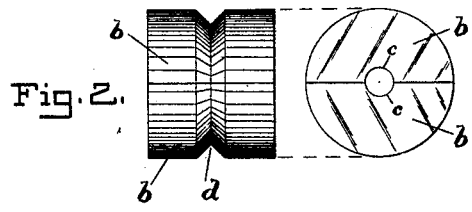
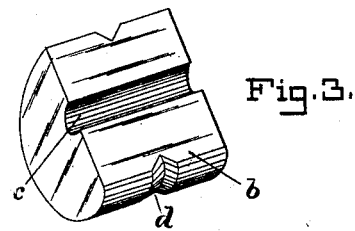
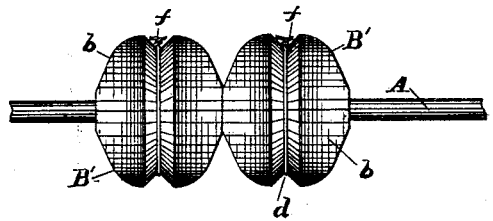
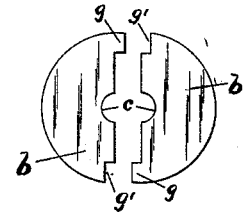
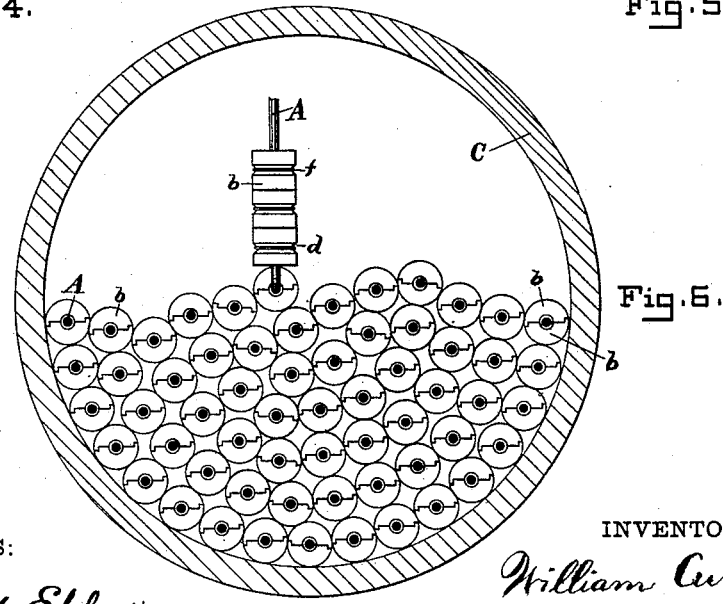
WITNESSES:
Otto H. Ehlers.
T. P. Davis.
INVENTOR:
William Curry,
BY Chas. B. Mann
ATTORNEY.

UNITED STATES PATENT OFFICE.

WILLIAM CURRY, OF BALTIMORE, MARYLAND.

GLASS-COVERED ELECTRIC WIRE.

SPECIFICATION forming part of Letters Patent No. 452,565, dated May 19, 1891.

Application filed March 5, 1891. Serial No. 383,846. (No model.)

*To all whom it may concern:*

Be it known that I, WILLIAM CURRY, a citizen of the United States, residing at Baltimore city, in the State of Maryland, have invented certain new and useful Improvements in Glass-Covered Electric Wires for Underground Conduits, of which the following is a specification.

This invention relates to glass-covered electric wires for underground conduits; and the object is to completely insulate from each other a number of wires lying closely together in a conduit-pipe and to accomplish this in a practical, convenient, and inexpensive manner.

With this end in view the invention consists in completely covering the wires with glass applied in tubular sections fitting up to each other, and each section comprising two parts or halves fitting together, one on each side of the electric wire, and bound together by a small flexible wire which is wholly contained within a groove encircling the tubular section.

In the accompanying drawings, illustrating the invention, Figure 1 represents a side view of a portion of an electric wire covered with my insulating glass sections; Fig. 2, two views of one of the tubular glass sections; Fig. 3, a perspective view of one of the half-sections comprising a tubular section; Fig. 4, a side view of a modified form of insulating-sections; Fig. 5, an end view of another modified form of tubular section; and Fig. 6, a cross-section of a conduit-pipe, showing a nest of wires laid in the same and insulated from each other by glass sections of my improved form, one of said wires being shown turned up to a vertical position to give a side view of the insulating-sections.

The letter A designates an electric wire to be covered with insulation, and B a tubular section of glass to be placed upon the same and comprising two parts or halves $b$, of half-tubular form, which fit together. In the abutting faces of these half-sections $b$ corresponding grooves $c$ are formed to accommodate the conducting-wire, and in their exterior curved surfaces grooves $d$ are made at the middle, which together form a continuous groove encircling the tubular section B, made up of the two half-sections $b$. In applying this insulating-piece to the wire the two half-tubular sections $b$ are placed together, one on each side of the same, with the conducting-wire engaging the grooves $c$ in the abutting faces of said sections $b$ and with the exterior grooves $d$ coinciding. The two sections are bound together by an encircling wire $f$, which engages in the exterior groove $d$, and whose ends are united in said groove. This wire is wholly contained in the groove and does not project therefrom at any point.

In carrying out my invention the electric wires are first laid in the underground conduit, (designated in the drawings by the letter C.) Two operators, standing in man-holes where access may be had to the wires, place tubular sections B on the same wire and tie them on with wire $f$ in the manner previously explained. As the tubular sections are attached they are shoved along the wire, and this is continued until the sections attached by one operator meet those attached by the other, and the length of wire between the two men will then be completely covered and insulated by the glass sections. Any number of wires in the same conduit-pipe may be treated in like manner, and a nest of them will appear as shown in Fig. 6, where it is apparent they are all insulated from each other.

It will be seen that by this process the wires can be insulated throughout their length with quickness and dispatch and that it is not necessary to begin from the end of the wire, but that the insulating-section can be readily applied at any point on the wire and slid along the same.

The use of glass sections is particularly advantageous because of the well-known superiority of glass as an insulator, its durability underground, and the cheapness of the material.

The short tubular sections allow of a curve or bend in the wire, and to specially adapt these sections for curved wires they may be formed as shown in Fig. 4, where their opposite ends B′ are conical or tapered, whereby the sections are capable of being turned at an angle to each other without difficulty or danger of breaking the glass.

In the modified form shown in Fig. 5 the abutting faces of the half-tubular sections $b$ are made to interlock. Each is provided at one side with a projecting flange $g$ and at the other with an offset $g'$. The flange of one section engages the offset of the other when the two sections are fitted together. This prevents one section sliding past the other laterally, as will be obvious, while the binding-wire $f$ prevents a longitudinal movement.

It will be apparent that tubular sections of varying lengths may be employed, and that more than one binding-wire may be used, if necessary.

It will readily be seen that each section may have the two forms shown in Figs. 1 and 5, or the two forms shown in Figs. 4 and 5. In any event I prefer to combine the interlocking feature shown in Fig. 5.

Having thus described my invention, what I claim as new, and desire to secure by Letters Patent, is—

1. Electric wires for underground conduits, covered with glass in short tubular sections strung loosely on them, with their ends in contact, each section comprising two half-tubular parts, one on each side of the wire, and provided with an exterior encircling groove, said half-tubular parts bound together by a wire engaging said groove and wholly contained therein.

2. Electric wires for underground conduits, covered with glass in short tubular sections strung loosely on them, with their ends in contact, each section comprising two half-tubular parts, one on each side of the wire, and each part having a projecting flange and an offset, the flange of one part engaging the offset of the other, said parts provided with an exterior encircling groove and bound together by a wire engaging said groove and wholly contained therein.

In testimony whereof I affix my signature in the presence of two witnesses.

WILLIAM CURRY.

Witnesses:
F. P. DAVIS,
JNO. T. MADDOX.